Dec. 6, 1966  R. P. DUNMIRE ETAL  3,289,675
TUBULAR HYPODERMIC NEEDLE
Original Filed Dec. 8, 1961  3 Sheets-Sheet 1

INVENTORS:
HANNAH DUNMIRE, Executrix
of the estate of RUSSELL P.
DUNMIRE, deceased and
HARRY O. EBY

ATTORNEYS

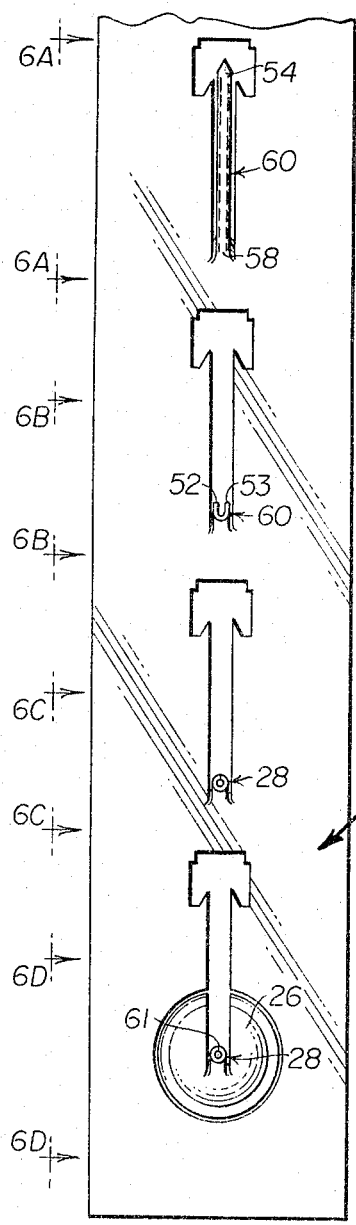
FIG. 3
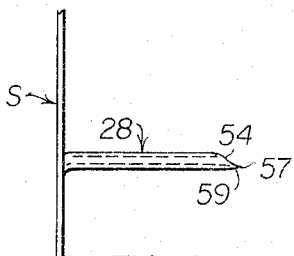
FIG. 6A
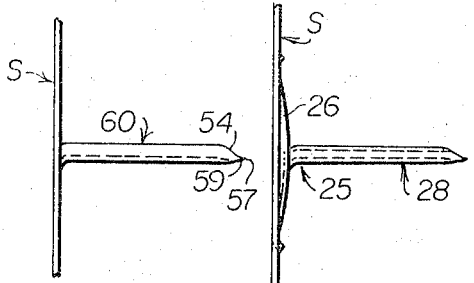
FIG. 6B
FIG. 6C
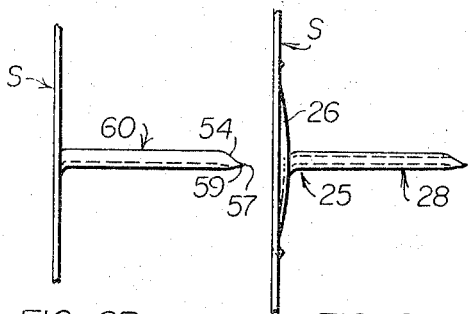
FIG. 6D
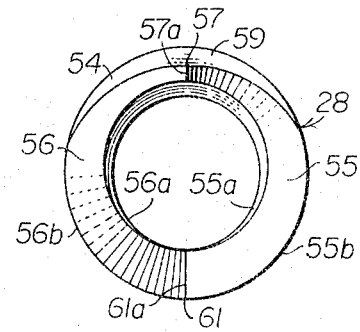
FIG. 7
INVENTORS:
HANNAH DUNMIRE, Executrix
of the estate of RUSSELL P.
DUNMIRE, deceased and
HARRY C. EBY
ATTORNEYS Dec. 6, 1966 R. P. DUNMIRE ETAL 3,289,675
TUBULAR HYPODERMIC NEEDLE
Original Filed Dec. 8, 1961 3 Sheets-Sheet 3

INVENTORS:
HANNAH DUNMIRE, Executrix
of the estate of RUSSELL P.
DUNMIRE, deceased and
HARRY C. EBY

ATTORNEYS

United States Patent Office 3,289,675
Patented Dec. 6, 1966

3,289,675
TUBULAR HYPODERMIC NEEDLE
Russell P. Dunmire, deceased, late of Chagrin Falls, Ohio, by Hannah Dunmire, executrix, Chagrin Falls, Ohio, and Harry C. Eby, Meadville, Pa.; said Eby assignor to said Hannah Dunmire, executrix
Original application Dec. 8, 1961, Ser. No. 158,944, now Patent No. 3,173,200, dated Mar. 16, 1965. Divided and this application May 25, 1964, Ser. No. 374,870
14 Claims. (Cl. 128—221)

This application is a division of a copending current application Serial No. 158,944, filed December 8, 1961, now Patent No. 3,173,200, for Sharp-Edged Metal Articles and Methods of Making the Same, said parent application having the claims thereof restricted to the method disclosed therein, and the present divisional application being directed to the sharp-edged metal articles.

This invention relates to the manufacture of a wide variety of sharp-edged metal articles, including hypodermic needles, surgical needles, sutures, and other acute medical instruments intended to be inserted through the epidermis. More particularly, the present invention is concerned with the manufacture of improved hypodermic needles adapted for use in disposable injection devices of the type disclosed in U.S. Patents Nos. 2,696,212 and 2,769,443 granted to Russell P. Dunmire on December 7, 1954, and November 6, 1956, respectively.

Heretofore, the general procedure for producing sharp-edged articles, and particularly pointed medical instruments of the type described, has been to form the body of the article from a suitable metal, which usually is in an annealed condition, and then to harden the metal and secure a cutting edge by a plurality of grinding operations. In the case of hypodermic needle manufacture, this conventional procedure has commonly involved the steps of producing hot-rolled seamless tubing from stainless steel or other metal and cold drawing the tubing to the desired diameter and wall thickness. Several cold drawing passes were required to reduce the hot-rolled tubing to the desired size, it being necessary to heat treat, pickle, and lubricate the tubing after each pass.

Following the cold drawing operations, the tubing was cut into appropriate lengths and an end of each length ground to a point. The most common point configuration has been a simple bevel formed on the end of the tube by first rough grinding the end of the tube to lie in a plane at an angle to the longitudinal axis of the tube, then finish grinding or honing the bevel point, and finally deburring the point.

Even though the foregoing procedure has been the accepted method of manufacturing hypoderimc needles for a number of years, it has long been recognized as an expensive, time-consuming procedure, frequently resulting in improperly formed needles which cannot be used to administer an injection satisfactorily and which cause excessive pain to the patient, including, in many instances, pyrogenic effects. For example, it will be seen that the very configuration of the conventionally ground bevel point is not conducive to a painless injection, since the flat surface of the point presents the full metal thickness of the needle wall to the skin rather than an advantageous, sharp cutting edge after the sharp, extreme tip has cut an initial slit. As a result, the conventional needle punctures and tears its way into the skin during the balance of its penetration.

As indicated above, the conventional grinding operations usually form both inner and outer turned-over burrs around the edges of the ground end of the needle. These metal burrs must be removed; otherwise they may break away and lodge in the skin or subcutaneous tissue and produce soreness and swelling. The usual deburring methods which have been resorted to are time-consuming and expensive and are not completely successful. Moreover, they tend to dull the point and to anneal and soften the metal so that the points are fragile and may be relatively easily damaged during shipping and handling prior to use.

In attempts to reduce the costly manufacturing operations which are involved in producing hypodermic needles from seamless tubing, it has recently been proposed to fabricate the needles from flat, fully annealed, metal blanks by bending the metal blanks into tubular form. It has also been proposed to form the blanks with triangular end portions which form the pointed end portions of the needles when the blanks are bent into tubular shape. In order to produce a satisfactory needle in this manner, however, the point must subsequently be hardened by heat treating and then be ground by the usual grinding techniques in order to obtain a sufficiently sharp point. Such grinding has produced a conventionally beveled point and perpetuated the above-discussed problems and draw-backs inherently involved in the more conventional method of producing needles from seamless tubing.

It will be appreciated that the desirability of having sharp, accurately formed, hypodermic needles is accentuated when the needles are intended for use in disposable types of injection devices for self-administration of injections, such as the types disclosed in my above-identified patents. This special need for the needles to be sharp and accurately formed so as to make their insertion as safe and painless as possible, is due to the natural aversion and apprehension which many people experience when giving themselves injections, and also to the fact that most persons are not trained to administer injections in the most efficient manner.

The particular type of self-injection devices common to the disclosures of U.S. Patents Nos. 2,696,212 and 2,769,443 of Russell P. Dunmire present still another problem. The needle in such devices is completely contained within an ampoule shell in such a position that, when the device is used, the pointed end of the needle is forced through a wall or diaphragm of plastic or the like and into the skin. When conventionally formed needles are used for this purpose, they frequently cause what is known as "coring"; that is, the passageway through the needle is plugged by a piece of material severed from the diaphragm or wall that is pierced by the needle. This severed piece of material may completely clog the needle so that it is virtually impossible to eject fluid through it. More frequently, the cored material is forced from the needle by the hypodermic liquid and is lodged beneath the skin. When this happens, such foreign material, as in the case of metal burrs, may cause soreness and swelling, including pyrogenic effects.

An object of the present invention is to provide sharp-edged metal articles, such as pointed hypodermic needles and other acute medical instruments and the like, which are characterized by hardness and sharpness of their cutting edges and points and by accurate, uniformly produced shapes.

Another object of the invention is to provide improved hypodermic needles which have desirable characteristics mentioned above and which are particularly adapted for use in self-injection devices.

Still other objects of the invention are to provide sharp-edged metal articles and, particularly, hypodermic needles of a design capable of being produced automatically from metal stock by mass production techniques at high speed and low cost; and to provide hypodermic needles having pointed ends of such a character and configuration as to make their insertion into the patient as safe and painless as possible.

While it is to be understood that the invention, in its broadest aspects, is not limited to hypodermic needles, the construction of such needles in accordance with the invention is considered to exemplify best the marked advantages which are afforded by the invention. Therefore, the invention will hereinafter be more particularly described in relation to hypodermic needles.

In accordance with the invention, hypodermic needles may be fabricated from flat, annealed, strip stock in a continuous operation which includes the steps of forming blanks having substantially rectangular cannula forming strips with wedge or triangular shaped end portions, and then bending each such strip into tubular shape with its side edges in abutment. In order to eliminate the disadvantageous grinding steps and attendant operations of the prior art, the invention contemplates selectively hardening and thinning the metal of the strip portions of the blanks in their wedge-shaped end portions, preferably prior to bending the blanks into finished form, although the invention is not necessarily restricted to employing such an order of fabrication steps.

According to the invention, the hardening of the tips or wedge-shaped ends of the blanks may be expeditiously accomplished by work hardening small areas of the strip stock before the blanks are severed therefrom. One advantage of selectively hardening the metal in this manner is that the relatively soft cannulae of the needles can be formed by one or more bending operations without intermediate heat treating steps as required by prior art methods. Another advantage is that the hard, sharp edges and points of the needles can be formed in a single, economical operation with improved accuracy, precision, and uniformity.

In addition to having sharp, hard points, the uniquely shaped pointed end portion of hypodermic needles manufactured according to the invention is characterized by sharp, inner and outer, peripheral, cutting edges. The conventionally ground point formation, as noted above, presents the full cross-sectional thickness of the needle wall to the skin during penetration so that the end of the needle must be forced through the skin with an often painful punching action. As distinguished therefrom, inner and outer peripheral cutting edges provided by the present invention act to separate the skin with a progressive cutting action during penetration so that the needle may be smoothly and quickly inserted with a minimum amount of discomfort and irritation.

When the hypodermic needles of the invention are used in disposable, self-injection devices of the types referred to above, the configuration of the pointed ends of the needles also has been found to substantially eliminate any tendency of the needles to core when they pierce the sealing diaphragms or walls of the injection devices.

Further objects and advantages of the invention will become apparent when the following detailed description is considered in conjunction with the accompanying drawings.

In the drawings:

FIGURE 3 is a view similar to FIG. 2, showing the same sheet metal strip and indicating the fourth through the seventh forming operations employed in making needles in accordance with the invention;

Figure 8:
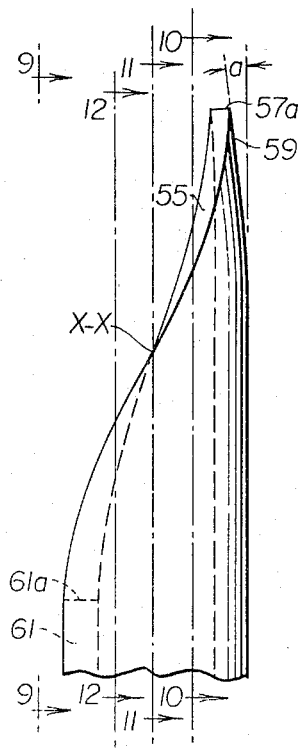
Figure 9:
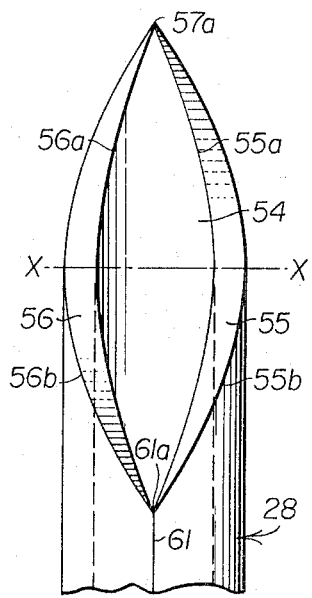
Figure 10:
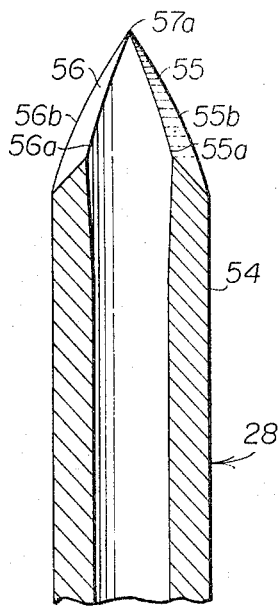
Figure 11:
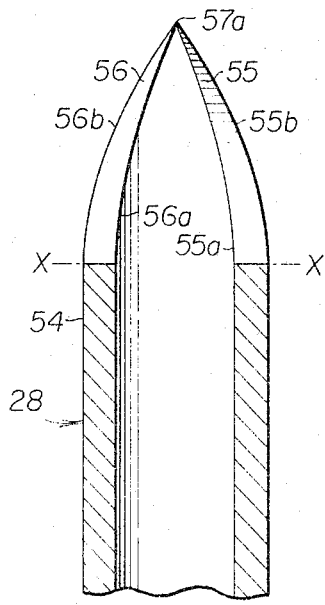
Figure 12:
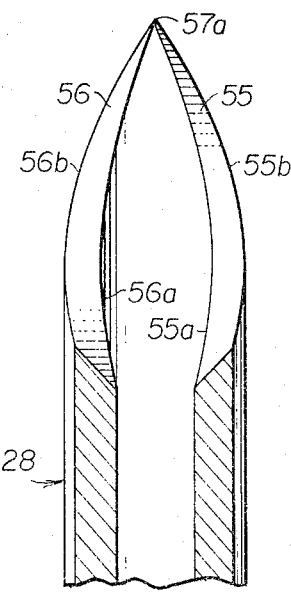
Figure 13:
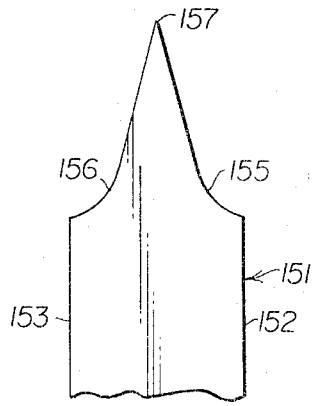

FIGURES 6A, 6B, 6C, and 6D are similar, fragmentary, edge views of the sheet metal strip of FIG. 3, taken as indicated by the lines 6A—6A, 6B—6B, 6C—6C, and 6D—6D, respectively, at the locations of the fourth, fifth, sixth, and seventh forming operations, respectively;

FIGURE 7 is a greatly enlarged end view of the pointed end of the needle at the conclusion of the seventh and last forming operation;

FIGURE 8 is a similarly enlarged side elevational view of the pointed end of the needle at the conclusion of the seventh and last forming operation;

FIGURE 9 is another greatly enlarged side elevational view of the pointed end of the needle at the conclusion of the seventh and last forming operation, this view being taken as indicated by the line 9—9 in FIGURE 8;

FIGURES 10, 11, and 12 are vertical or longitudinal sectional views of the pointed end portion of the needle at the conclusion of the seventh and last forming operation, taken as indicated by the lines 10—10, 11—11, and 12—12, respectively, in FIG. 8;

FIGURE 13 is a greatly enlarged, fragmentary, plan view of a modified form of cannula blank that may be produced in the third forming operation in order to obtain a more sharply pointed tip on the finished needle.

Figure 1:
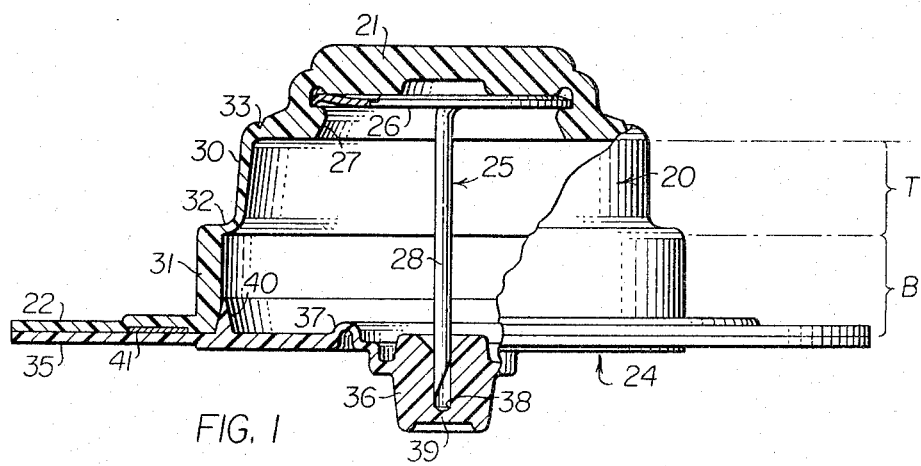
FIGURE 1 is a greatly enlarged, vertical, cross-sectional view of a hypodermic ampoule embodying a hypodermic needle made in accordance with the present invention.

Before describing in detail the hypodermic needle formation which comprises one aspect of the invention, and its preferred method of manufacture, reference is first made to FIG. 1 which illustrates a particular type of needle in a particular type of hypodermic ampoule. It is to be understood at the outset that the specific construction of this ampoule forms no part of the present invention and will be described only for the purposes of indicating one application for which the invention is particularly suitable and for explaining how the novel configuration of the pointed end of the needle effects functional improvements over prior art hypodermic needle constructions.

As shown in FIG. 1, the hypodermic ampoule has a body portion 20 in the general form of an inverted cup-shaped shell defined by an upper end wall 21 and a circumferentially extending side wall. A peripherally outwardly extending flange 22 integrally extends around the open end or mouth of the body 20, and a disk-like diaphragm 24 is sealed to this flange 22 so as to close the mouth of the body and form a fluid reservoir for containing the hypodermic liquid (not shown).

Enclosed entirely within the ampoule is a hypodermic needle 25 constructed according to the present invention. In its preferred construction, the needle 25 has a circular, disk-like base 26 that is clamped adjacent the upper end wall 21 of the body 20 by a radially inwardly extending rib 27 so that a cannula 28 of the needle, which extends axially from the base of the needle, is in substantial alignment with the axis of the ampoule body and has its pointed end projecting downwardly in position to be forced through the diaphragm 24. A cannula opening (not shown) through the base 26 of the needle and into the adjacent butt end of the cannula permits the hypodermic liquid to be evacuated from the ampoule through the cannula after it has pierced the diaphragm.

As more specifically described in the copending application of Russell P. Dunmire, Serial No. 138,999, filed September 18, 1961 (now Patent No. 3,094,987), the body portion 20 is constructed so that at least 90% of the hypodermic liquid can be discharged from the ampoule when it is subject to an axially directed collapsing force of not more than 10 or 12 pounds. Provision is also made to prevent the ampoule body from elastically expanding back toward its original shape after it has once been collapsed, thereby avoiding the creation of a vacuum tending to suck up or aspirate the hypodermic liquid back into the ampoule body.

To these ends, the preferred ampoule body 20 includes a top section T defined by a flexible portion 30 of the circumferential side wall and a bottom section B of larger diameter defined by a relatively rigid and inflexible wall portion 31. The portion 30 of the side wall that defines the top section T is tapered from a maximum thickness at its uper end to a minimum thickness at its lower end, while the portion 31 of the side wall that defines the bottom section B has a thickness approximately twice the maximum thickness of the top side wall portion 30. The top and bottom sections T and B are connected by a relatively thin shoulder 32 which is no thicker and may be slightly thinner than the minimum thickness of the top side wall portion 30. This shoulder 32 defines the location of a primary hinge about which the circumferential side wall of the ampoule is folded to initiate collapsing thereof by a progressive inverting movement of the top section downwardly within and against the bottom section when axial pressure is applied to the ampoule.

The body construction 20 is further shown as including a circumferential notch 33 around the upper end wall 21. This notch defines the location of a secondary hinge which permits the top section T to be inverted and nested within the bottom section B with the upper end wall 21 of the ampoule locked against the diaphragm 24.

As more specifically described in another copending application of Russell P. Dunmire, Serial No. 139,000, filed September 18, 1961 (now patent No. 3,094,988), the diaphragm 24 is constructed to avoid a rapid build-up of hydraulic pressure within the liquid-filled shell and a consequent "hydraulic lock" which could result in the ampoule body being ruptured before the hypodermic needle can be forced through the diaphragm at the initiation of an injection. Provision is also made to guide the hypodermic needle for entry into the skin in a direction substantially perpendicular thereto and to prevent an undesirable loss of the hypodermic liquid during an injection, as by leakage around the outside of the needle where it pierces the diaphragm. To these ends, the diaphragm 24 has an outer annular portion 35, a thick, elongated, centrally located, needle guiding and liquid sealing gland 36, and a relatively thin, flexible, corrugated, intermediate portion 37 connecting the gland and outer portion to permit relative movement therebetween. An axial, needle receiving passage 38 extends into the upper end of the gland from inside the ampoule and terminates short of the opposite, lower end of the gland to form a thin, easily puncturable wall 39 closing the bottom of the passage. The lower end of the needle cannula 28 is slidably constrained within the passage with an interference fit and with the pointed end of the needle being normally spaced from the puncturable wall 39.

Due to the stiffness of the gland 36 and the length over which it contacts the needle, an effective, peripheral, liquid seal is maintained around the needle under the hydraulic pressure created during discharge of the ampoule. At the same time, the gland 36 is effective to support and pilot the needle during an injection. This guided movement of the needle minimizes the possibility of its being cocked and inserted at an oblique angle which might tear the skin and/or fail to penetrate to the required depth for an effective injection.

The thin, flexible, corrugated wall section 37 of the diaphragm 24 permits the gland 36 to move axially inwardly of the ampoule when the diaphragm is initially pressed against the skin. Because of this movement of the gland, the distance through which the pointed end of the hypodermic needle 25 must travel before it pierces the diaphragm wall 39 and relieves the hydraulic pressure within the ampoule is relatively small. To the extent that inward movement of the gland 36 tends to reduce the interior volume of the liquid filled shell, the corrugated wall section 37 of the diaphragm is capable of bulging outwardly momentarily until the needle has punctured the diaphragm and provided an escape path through the needle for the liquid. Consequently, it is possible to provide sufficient clearance between the pointed end of the needle and the gland wall portion 39 to avoid accidental puncturing of the diaphragm during handling of the ampoule, and at the same time, to prevent the creation of a hydraulic lock at the start of an injection.

The diaphragm 24 is further shown to include a stiff, annular rib 40 integrally extending from the upper surface of the outer diaphragm portion 35. This rib 40 is formed on a diameter such that it may be tightly nested within the mouth of the ampoule body against its inner wall surface. During filling and assembly of the ampoule shell, the rib 40 aids in locating the diaphragm 24 with respect to the body 20 so that the cannula 28 of the needle 25 can be aligned with and accurately inserted within the needle passage 38 of the gland 36. The rib 40 also forms a temporary liquid seal for preventing the hypodermic liquid from spilling from the mouth of the ampoule body 20 prior to the diaphragm and body being permanently sealed together around their peripheries.

The hypodermic ampoule, including the body 20 and the diaphragm construction 24, may be made of any flexible material which is inert and retains its strength when exposed to the hypodermic liquid and which will not rupture and/or tear as the ampoule is collapsed. Suitable materials include tough but relatively flexible, elastomeric compounds, including plastics such as polyethylene and various other polyvinyl compounds and the like, plastic coated metal foils, and uncoated metal foils which may be joined to form a leakproof liquid seal.

When, as in the preferred embodiment of the invention, the ampoule is made of plastic and the body 20 and diaphragm 24 are joined by heat sealing, the circumferential flange 22 is preferably formed with an annular groove in which is seated a heat conducting metal ring 41. As more fully explained in the copending application of Russell P. Dunmire, Serial No. 252,272, filed January 15, 1963 (now abandoned) the metal ring 41 facilitates a quick and localized application of heat to effect the heat sealing of the body flange 22 and the outer annular portion 35 of the diaphragm 24 so as to prevent the hypodermic liquid from being deleteriously affected by the heat and the material of the ampoule from being seriously weakened by overheating.

In use, the ampoule is positioned with the diaphragm 24 against the skin, and an axially inwardly directed force is applied to the upper end wall 21, either manually with the thumb or by means of a mechanical applicator, as may be desired. The initial application of pressure to the upper end wall forces the gland 36 inwardly relative to the body 20 and causes the pointed end of the needle to penetrate the relatively thin gland wall 39. Continued application of pressure results in the hypodermic needle being inserted into the skin and the body 20 being collapsed so as to discharge substantially all of the hypodermic liquid through the needle.

Reference is now made to the preferred method of manufacturing the hypodermic needles 25. This method contemplates forming a plurality of the needles from a metal strip S by a continuous operation involving the successive metal working and forming steps illustrated in FIGS. 2–5, and 6A–6D.

For reasons which will hereinafter be made apparent, it is necessary to the preferred practice of the invention that the metal of the strip S from which the needles are formed possess work hardening properties. Another consideration is that the needles be resistant to corrosive attack by hypodermic liquids. This latter criterion is of particular importance when the needles are intended to be sealed within ampoules such as the one illustrated in FIG. 1, since the needles will usually be retained in contact with the hypodermic liquid for extended periods of time.

Since the formulations of hypodermic liquids, and hence the corrosive environment to which the hypodermic needles are subjected, vary widely, a particular metal cannot be arbitrarily selected and used in all applications. Instead, it may frequently be necessary to test various metals in conjunction with particular hypodermic liquids before the optimum metal can be accurately selected. However, stainless steels, and more specifically the austenitic chromium-nickel steels, have been found to be well suited for the purposes of the present invention since they normally exhibit the required properties noted above. For example austenitic chromium-nickel steels having a combined chromium-nickel content of at least 23% with a minimum chromium content of 16% and a minimum nickel content of 7%, are noted for their rapid work hardening. In addition, when austenitic chromium-nickel steels are properly heat treated, they exhibit a wide range of passivity in corrosive solutions. A particular austenitic chromium-nickel steel which has been used successfully is A.I.S.I. type 304.

While stainless steel has been described as the preferred metal for the purposes of the present invention, other work hardenable metals, such as brass, plated carbon steel, and the like, also may be used in proper environments.

Figure 2:
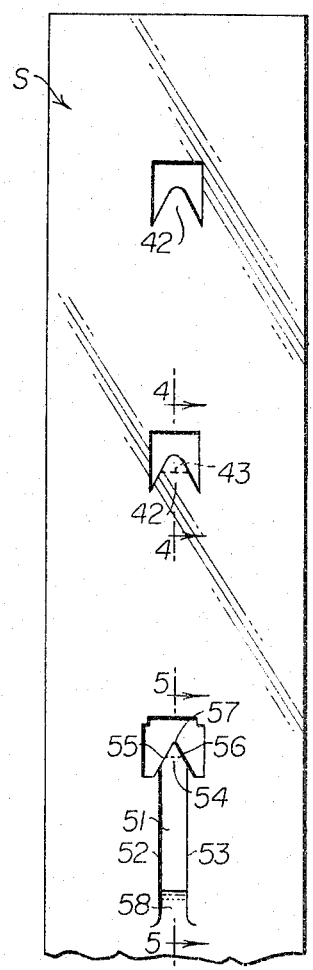
FIGURE 2 is an enlarged, fragmentary plan view of a sheet metal strip from which a hypodermic needle is progressively formed in accordance with the invention by a series of punching and shaping operations, only the results of the first three forming operations being illustrated in this view.
Figure 4:
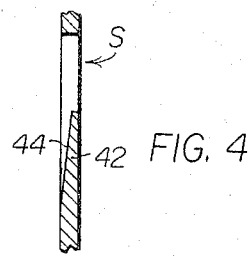
FIGURE 4 is a further enlarged, fragmentary, longitudinal, sectional view of the sheet metal strip of FIG. 2, taken as indicated by the line 4—4 in FIGURE 2 at the location of the second forming operation.

As shown in FIG. 2, the first step in the preferred procedure of forming the hypodermic needle 25 is to punch out a relatively small, generally U-shaped piece from the strip S so as to form a tongue 42 that extends into the punched out space. The tongue 42 is then work hardened in the triangular area between the broken line 43 and the end of the tongue 42. This step of work hardening the tongue 42 may be carried out by a cold working operation in which the bottom surface 44 of the tongue is coined or swaged with suitable dies (not shown) so that the metal is progressively reduced in cross-sectional thickness from the full thickness of the strip at the base of the triangular area to a minimum thickness near its tip (FIG. 4). The punched out space into which the tongue 42 extends facilitates the local cold working and work hardening operation by allowing the metal to flow laterally as the tongue is coined and reduced in cross-sectional thickness.

In carrying out the invention, it is usually desirable to effect a reduction in metal thickness in the tongue 42 of at least 50% and up to 70% in order to assure that the coined metal is densified and materially hardened as compared to the rest of the strip. The specific amount of cold working which is required depends upon the particular metal employed. However, in a typical instance where the metal is type 304 stainless steel and the initial thickness of the strip S is in the range of .005 and .010 inch, the minimum metal thickness within the coined area of the tongue is from .002 and .003 inch.

Figure 5:
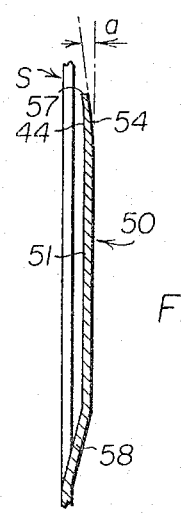
FIGURE 5 is a similar, fragmentary, longitudinal, sectional view of the sheet metal strip of FIG. 2, taken as indicated by the line 5—5 in FIGURE 2 at the location of the third forming operation.

In the next operation or, if desired, the next several operations, a strip-like cannula body blank 50 is defined and partially severed from the strip S. As shown in FIGS. 2 and 5, this cannula blank 50 is shaped to include a rectangular body portion 51 having parallel sides 52 and 53 and a wedge shaped end portion 54 extending from one end of the body portion and defined by straight sides 55 and 56 that converge symmetrically so that the end portion 54 has its point 57 lying on the longitudinal axis of the strip-like blank. The included angle between the converging sides 55 and 56 is an acute angle between about 55° and at most, 65° according to the presently preferred embodiment of the invention. It is to be understood, however, that the particular configuration of the pointed, terminal end of the cannula blank can be varied in order to produce hypodermic needles which are specifically designed for special injections. In this blank forming operation, the original U-shaped opening in the strip may be enlarged as shown to facilitate trimming of the converging edges 55 and 56 of the pointed end of the blank 50.

The other end of the blank 50, opposite from the point 57, is not severed from the strip, but is angularly bent in the region generally indicated by reference numeral 58 so that the major part of the cannula blank extends substantially parallel to and slightly above the upper surface of the metal strip S.

It will be observed in FIGS. 2 and 5 that a substantial part of the wedge shaped or tapered end portion 54 is formed from the coined portion of the tongue 42 with the point 57 lying in that portion of the coined area which is approximately of minimum cross-sectional thickness. As a result, the tapered end portion 54 has a thickness which tapers from the full metal thickness of the body portion 51 of the blank 50 to the point 57. Although the point 57 appears to be blunt in the enlarged cross-sectional view of FIG. 5, the actual metal thickness is approximately .002 to .003 inch, and therefore, the point is as sharp or sharper than ground hypodermic needles of the prior art. With the acute angle between the converging sides 55 and 56 described above, the extreme pointed end of the needle makes its initial penetration of the skin with ease and virtually painlessly.

The cannula body blank 50 may be formed by punching the strip S and tongue 42 against their under-surface with one or a series of suitably shaped male dies (not shown) which may be moved upwardly into cooperating female dies (also not shown) so as to blank out the needle cannula with what is actually a shearing action. As will be recognized by those familiar with metal working practices, when the dense, work hardened metal in the tongue 42 is acted on by the punching dies, the male die will only partially cut through the metal and will then simply break or fracture the metal. This action of forming the blank 50 and its pointed end portion 54 by bodily breaking it out of a hard, dense metal area advantageously results in substantially burr-free edges along the sides of the blank out to the point 57. Another advantage, which is more fully explained below, is that the end portion 54 of the blank 50 is toed downward toward the plane of the strip S a slight amount, as indicated by angle "a" in FIG. 5.

In the next stage of the preferred manufacturing procedure, the substantially flat cannula blank 50 is semi-formed by bending it into the generally U-shaped configuration designated by reference numeral 60 in FIGS. 3 and 6A. This is accomplished by suitable, cooperating dies (not shown) for symmetrically bending the blank 50 about its longitudinal axis so that its sides 52 and 53 extend downwardly toward the plane of the strip S. Because of the narrowness of the blank adjacent the point or apex 57 of the tapered end portion 54, and also because of the above described work hardening of the metal in this region, it tends to resist bending, leaving a more nearly flat extreme end portion 59 closely adjacent the point 57.

The semi-formed cannula blank 50 is then bent vertically, as illustrated in FIGS. 3 and 6B, so that it is substantially perpendicular to the strip S, and, in a subsequent operation, is finish formed by bending the sides 52 and 53 into edge abutment to form the seam 61 (FIGS. 3, 7, and 9), thus completing the tubular cannula section 28 with its pointed end or tip 57 and its nearly flat, and slightly toed-in extreme end portion 59.

In the final step of manufacture illustrated in FIGS. 3 and 6D, a generally circular portion of the strip S surrounding the upstanding cannula 28 is dished axially and centrally in the direction of the point of the needle and its circular periphery is turned slightly in the same direction to form the needle base 26 with a desired configuration while the base is severed from the strip.

As will be apparent to those skilled in the metal working art, all of the foregoing operations may be advantageously performed by a conventional, multi-slide, automatic punch press. It will be further apparent, that while the needle-forming process described above constitutes an economical and practical method of manufacture, the preferred procedure is subject to many variations by combining and/or reversing certain of the individually described forming steps. Also, operations described above as being performed as a single deforming and/or severing step may be divided into a series of progressive deforming and severing steps as the particular tooling used may require.

Among the important advantages of the foregoing method of manufacture is the elimination of the prior art operations of grinding, honing, and deburring which were necessary to the formation of a sharp needle point. As noted above, the steps of preliminarily coining the metal strip and then breaking out the tip of the cannula blank from the coined and work hardened metal results in a hard, substantially burr-free point. Only in special cases is it necessary to hone the point after the needle has been severed from the strip. Further, since only the tip and converging edges of the tongue-shaped cannula blank are hardened by cold working, the remainder of the blank being in a relatively soft, annealed condition, the hypodermic needle 30 may be progressively formed by successive metal bending steps without requiring intermediate annealing operations.

The elimination of the conventional grinding, deburring, honing, and annealing operations effects a substantial decrease in the cost of producing hypodermic needles. Moreover, the method comprising the invention lends itself to the manufacture of hypodermic needles having more uniform dimensions and sharpness than could be obtained by the usual method in which the needle cannula was drawn and its point produced by grinding.

Other advantages afforded by the method of the invention result from the novel configuration of the pointed end of the needle which is provided with a sharp point and sharp cutting edges for facilitating penetration of the needle through the wall of a plastic ampoule and its insertion into the skin, as hereinafter discussed in more detail.

The exact formation of the pointed end of the needle is difficult to determine precisely because of its very small size. However, it appears from photomicrographs that the pointed end portion 54 of the needle has sharp, peripheral cutting edges that engage and cut into the skin with a skin spreading action after the initial penetration of the sharp point 57, and that this, together with the slightly toed-in and nearly flat spade-like extremity 59 of the pointed end, illustrated best in FIGS. 7 and 8, appears to contribute to the improved skin penetrating action of the needle and to the absence of coring as the needle penetrates the diaphragm 24 of the ampoule.

As shown particularly in FIGS. 8 and 9, the sides or edge surfaces 55 and 56 of the pointed end portion of the needle intersect at an acute angle along a diametrical line 57a (FIG. 8) at the point or apex 57. From this apex 57, the edge surfaces 55 and 56 diverge and twist axially and circumferentially of the needle cannula into substantially coplanar alignment at the locations designated by the line x—x in FIGS. 8, 9, and 11, substantially where they reach the diametrically opposite points of their widest separation. From the line x—x, the edge surfaces 55 and 56 continue to twist and progressively converge again axially and circumferentially of the needle cannula and toward the seam 61. At the seam 61, the edge surfaces 55 and 56 again intersect along a diametrical line 61a (FIGS. 7–9) that is parallel to their point or apex line of intersection 57a. As will be apparent from FIG. 9, the angle of intersection of the edge surfaces 55 and 56 varies from well in excess of 45° at the intersection of the edges 55b and 56b to well under 45° at the intersection of the edges 55a and 56a, the average angular value as shown being approximately 45°.

The twisting of the edge surfaces 55 and 56, as described above, involves a 180° twist of each edge surface. Referring particularly to FIGS. 8, 10, and 11, it will be seen that the inner edges 55a and 56a of the edge surfaces 55 and 56 from the line 57a at the pointed extremity of the needle around in opposite directions to the line x—x are in position to first contact the skin when the needle is inserted, perpendicular thereto. Also, down to the line x—x from their intersection 57a, the edge surfaces 55 and 56 slope downwardly and outwardly from the inner edges 55a and 56a, as is more readily apparent from FIG. 10. Because of this formation, it is believed that the inner edges 55a and 56a initially act to sever the skin and the edge surfaces 55 and 56 initially act to spread the skin apart as the needle is inserted.

At the line x—x, as best illustrated in FIGS. 8 and 11, the full thickness of the metal along the edge surfaces 55 and 56 will be pressed against the skin, as occurs with conventionally ground bevel points. However, this occurs only for a minute part of the penetration. As the edge surfaces begin to converge toward the seam 61, the outside edges 55b and 56b have, in effect, been gradually turned over the inner edges 55a and 56a sufficiently to lead the edges 55a and 56a (FIGS. 8 and 12) and present sharp peripheral cutting edges to the skin so as to cut rather than tear the skin, and a virtually painless overall penetration of the skin occurs. In this latter region, the edge surfaces 55 and 56 slope downwardly and inwardly, as is more readily apparent from FIG. 10.

Probably because of the same cutting and initial spreading action described above, the coring problem encountered with conventionally beveled points has been eliminated. The substantially flat extreme end portion 59 of the pointed end of the needle and the inward toeing thereof, as shown and described, also appear to be factors in eliminating coring. However, when the average value of the apex angle at the line 57a between the side edges 55 and 56 is much less than shown in the drawings (e.g., around 30°), the needle of FIGS. 2–12 shows pronounced coring tendencies. This appears to be due to the fact that the angle between these side edges at 61a is then also much more acute and tends to act as a narrow slit so as to catch, hold, and, perhaps tear loose fragments of plastic. Thus, the particular angles referred to are more or less critical.

Whatever the correct and complete explanation of the performance may be, the needles produced by the method of the present invention and having the particular configuration described avoid the coring problem and provide virtually painless penetration of the skin. As a result, they are ideally suited for use in the general type of ampoule shown in FIG. 1.

Referring finally to the modified cannula blank 151 shown in FIG. 13 on an enlarged scale, the initial apex angle at the point 157 has been decreased from about 45° (FIG. 2) to about 30° in order to obtain the effect of a sharper point and even easier puncturing of the ampoule diaphragm and initial penetration of the skin. In order to do this and still avoid the above described coring problem, however, it has been found necessary to curve the sides 155 and 156 (corresponding to the sides 55 and 56 in the blank of FIG. 2) outwardly in the region closely adjacent the parallel sides 152 and 153 of the blank, while retaining the planar configurations of the sides 155 and 156 over the remainder and major portions of their length, as shown. By doing this, the angle of intersection of the edge surfaces 155 and 156 with each other where they meet at the longitudinal butt seam of the finished needle may be kept large (as shown and described with reference to FIG. 9), and the coring problem of the prior art is still avoided. However, as will be readily appreciated, this renders the production of the point forming dies more difficult, and the benefits of the sharper point will generally be found to be so slight and questionable that they are not worth the added complication and possibly greater tendency to produce ragged or irregular edges along the converging sides 155 and 156.

Although the improved needles of the invention are advantageously produced from flat strip stock by the procedure described in detail, it will be apparent to those skilled in the art that certain features of the invention may be employed to advantage in the formation of points on articles other than needles, and in the formation of points on seamless cannulae made by conventional procedures or on butt seam cannula tubing shaped from flat strip stock before pointing. For example, solid needles for other than hypodermic purposes may be advantageously pointed for some purposes by first cold working an end of a round needle shank to harden and flatten it. Then, by the same punching technique described with reference to FIG. 3, a hardened, slightly flattened point may be formed.

In the case of hypodermic needle cannulae and the like made from conventional seamless tubing or seam tubing, the formation of a work hardened point might be performed as the final fabrication step, as by grinding a conventional bevel, flattening and thinning the tip, and finally trimming the deformed tip portion.

In view of the many possible applications of the principal features of the method phase of the invention, the term "blank," as used herein in its broadest sense, is intended to include any form of unfinished article on which one or more final fabricating steps may be performed to produce a finished article.

From the foregoing description of my new method of making hypodermic needles and the novel structure and characteristics of the resulting needles, it will be apparent that the several objects and advantages of the invention have been achieved in a practical and efficient manner. It will also be apparent to those skilled in the art that various changes may be made in the invention as specifically illustrated and described herein, without departing from the invention as defined by the accompanying claims.

What is claimed is:

1. A tubular hypodermic needle having a pointed end defined by a pair of end edge surfaces that diverge axially of the cannula from an apex at its point while extending around the cannula in opposite directions from one side to the opposite side thereof, said end edge surfaces intersecting at said apex and at said opposite side along lines substantially normal to the axis of the cannula, and each of said surfaces twisting continuously about a median line thereof from said apex to said intersection at the opposite side of the needle through an angle of 180°, at least the apex and adjacent portions of said end edges being hardened and thinned.

2. A tubular hypodermic needle having a pointed end defined by a pair of end edge surfaces that diverge axially of the cannula from an apex at its point while extending around the cannula in opposite directions from one side to the opposite side thereof, said end edge surfaces intersecting at said apex and at said opposite side along lines substantially normal to the axis of the cannula, and each of said surfaces twisting continuously about a median line thereof from said apex to said intersection at the opposite side of the needle through an angle of 180°, at least the apex and adjacent portions of said end edges being hardened and thinned, and the pointed end portion of the needle between said hardened and thinned end edge portions being toed inwardly toward the axis of the needle.

3. A tubular hypodermic needle having a pointed end defined by a pair of end edge surfaces that diverge axially of the cannula from an apex at its point while extending around the cannula in opposite directions from one side to the opposite side thereof, said end edge surfaces intersecting at said apex and at said opposite side along lines substantially normal to the axis of the cannula, and each of said surfaces twisting continuously about a median line thereof from said apex to said intersection at the opposite side of the needle through an angle of 180°, at least the apex and adjacent portions of said end edges being hardened and thinned, and the pointed end portion of the needle between said hardened and thinned end edge portions being relatively flat compared to the circumferential curvature of the balance of the needle and being toed inwardly toward the axis of the needle.

4. A tubular hypodermic needle having a pointed end defined by a pair of non-planar edge surfaces that diverge axially and circumferentially of the needle cannula from an apex at its point and then converge axially and circumferentially of the needle cannula to an intersection on the opposite side of the needle cannula from said apex, said apex and said intersection both extending linearly at their respective locations for the thicknesses of the needle cannula wall at those locations and substantially radially of the needle cannula in a common diametrical plane.

5. A tubular hypodermic needle having a pointed end defined by a pair of non-planar edge surfaces that diverge axially and circumferentially of the needle cannula from an apex at its point and then converge axially and circumferentially of the needle cannula to an intersection on the opposite side of the needle cannula from said apex, said apex and said intersection both extending linearly at their respective locations for the thicknesses of the needle cannula wall at those locations and substantially radially of the needle cannula in a common diametrical plane, and said needle cannula having a longitudinal butt seam containing said intersection and lying in said common diametrical plane.

6. A tubular hypodermic needle having a pointed end defined by a pair of non-planar edge surfaces that diverge axially and circumferentially of the needle cannula from an apex at its point and then converge axially and circumferentially of the needle cannula to an intersection on the opposite side of the needle cannula from said apex, said apex and said intersection both extending linearly at their respective locations for the thicknesses of the needle cannula wall at those locations and substantially radially of the needle cannula in a common diametrical plane, and said needle cannula having a longitudinal butt seam containing said intersection and lying in said common diametrical plane, said butt seam being closed solely by abutment of the needle stock on opposite sides thereof without welding or fusion of the metal on opposite sides of said seam.

7. A tubular hypodermic needle having a pointed end defined by a pair of non-planar edge surfaces that diverge axially and circumferentially of the needle cannula from an apex at its point and then converge axially and circumferentially of the needle cannula to an intersection on the opposite side of the needle cannula from said apex, said apex and said intersection both extending linearly at their respective locations for the thicknesses of the needle cannula wall at those locations and substantially radially of the needle cannula in a common diametrical plane, and said non-planar end edge surfaces intersecting at said apex at an average angle of approximately 45°.

8. A tubular hypodermic needle having a pointed end defined by a pair of nonplanar end edge surfaces that diverge axially and circumferentially of the needle cannula from an apex at its point and then converge axially and circumferentially of the needle cannula to an intersection on the opposite side of the needle cannula from said apex, said apex and said intersection both extending linearly at their respective locations for the thicknesses of the needle cannula wall at those locations and substantially radially of the needle cannula in a common diametrical plane, and said non-planar end edge surfaces intersecting at said intersection at an average angle well in excess of 30°.

9. A tubular hypodermic needle having a pointed end defined by a pair of non-planar end edge surfaces that diverge axially and circumferentially of the needle cannula from an apex at its point and then converge axially and circumferentially of the needle cannula to an intersection on the opposite side of the needle cannula from said apex, said apex and said intersection both extending linearly at their respective locations for the thicknesses of the needle cannula wall at those locations and substantially radially of the needle cannula in a common diametrical plane, and said non-planar end edge surfaces intersecting at said apex at an average angle of approximately 45° and intersecting at said intersection at an average angle well in excess of 30°.

10. A tubular hypodermic needle having a pointed end defined by a pair of non-planar edge surfaces that diverge axially and circumferentially of the needle cannula from an apex at its point and then converge axially and circumferentially of the needle cannula to an intersection on the opposite side of the needle cannula from said apex, said apex and said intersection both extending linearly at their respective locations for the thicknesses of the needle cannula wall at those locations and substantially radially of the needle cannula in a common diametrical plane, and said non-planar end edge surfaces each twisting through an angle of substantially 180° between said apex and said intersection with a substantially uniform, gradual twist.

11. A tubular hypodermic needle having a pointed end defined by a pair of non-planar edge surfaces that diverge axially and circumferentially of the needle cannula from an apex at its point and then converge axially and circumferentially of the needle cannula to an intersection on the opposite side of the needle cannula from said apex, said apex and said intersection both extending linearly at their respective locations for the thicknesses of the needle cannula wall at those locations and substantially radially of the needle cannula in a common diametrical plane, and said non-planar end edge surfaces each twisting through an angle of substantially 180° between said apex and said intersection with a substantially uniform, gradual twist that brings them into substantially coplanar alignment midway between said apex and said intersection.

12. A tubular hypodermic needle having a pointed end defined by a pair of end edge surfaces that diverge axially of the cannula from an apex at its point while extending around the cannula in opposite directions from one side to the opposite side thereof, said end edge surfaces intersecting at said apex and at said opposite side along lines substantially normal to the axis of the cannula, and each of said surfaces twisting continuously about a median line thereof from said apex to said intersection at the opposite side of the needle through an angle of 180°, at least the apex and adjacent portions of said end edges being work-hardened and thinned.

13. A tubular hypodermic needle having a pointed end defined by a pair of end edge surfaces that diverge axially of the cannula from an apex at its point while extending around the cannula in opposite directions from one side to the opposite side thereof, said end edge surfaces intersecting at said apex and at said opposite side along lines substantially normal to the axis of the cannula, and each of said surfaces twisting continuously about a median line thereof from said apex to said intersection at the opposite side of the needle through an angle of 180°, at least the apex and adjacent portions of said end edges being work-hardened and thinned, and the pointed end portion of the needle between said work-hardened and thinned edge portions being toed inwardly toward the axis of the needle.

14. A tubular hypodermic needle having a pointed end defined by a pair of end edge surfaces that diverge axially of the cannula from an apex at its point while extending around the cannula in opposite directions from one side to the opposite side thereof, said end edge surfaces intersecting at said apex and at said opposite side along lines substantially normal to the axis of the cannula, and each of said surfaces twisting continuously about a median line thereof from said apex to said intersection at the opposite side of the needle through an angle of 180°, at least the apex and adjacent portions of said end edges being work-hardened and thinned, and the pointed end portion of the needle between said work-hardened and thinned end edge portion being relatively flat compared to the circumferential curvature of the balance of the needle and being toed inwardly toward the axis of the needle.

References Cited by the Examiner

UNITED STATES PATENTS

| | | | |
|---|---|---|---|
| 2,187,259 | 1/1940 | Barnhart | 128—221 |
| 2,769,443 | 11/1956 | Dunmire | 128—216 |
| 2,944,549 | 7/1960 | Alexander | 128—216 |
| 3,071,135 | 1/1963 | Baldwin et al. | 128—221 |
| 3,082,769 | 3/1963 | Palmer | 128—221 |

FOREIGN PATENTS 1,225,009   2/1960   France.

RICHARD A. GAUDET, *Primary Examiner.*

ROBERT E. MORGAN, *Examiner.*